US011513560B2

(12) United States Patent
Dong et al.

(10) Patent No.: US 11,513,560 B2
(45) Date of Patent: Nov. 29, 2022

(54) SUPPORT SUBSTRATE FOR FLEXIBLE DISPLAY DEVICE, AND FLEXIBLE DISPLAY DEVICE

(71) Applicant: BOE TECHNOLOGY GROUP CO., LTD., Beijing (CN)

(72) Inventors: Liming Dong, Beijing (CN); Haoran Wang, Beijing (CN); Fangxu Cao, Beijing (CN); Zhao Li, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 100 days.

(21) Appl. No.: 16/860,429

(22) Filed: Apr. 28, 2020

(65) Prior Publication Data
US 2021/0165454 A1 Jun. 3, 2021

(30) Foreign Application Priority Data

Nov. 28, 2019 (CN) .......................... 201911192935.3

(51) Int. Cl.
B32B 3/24 (2006.01)
G06F 1/16 (2006.01)
B32B 3/26 (2006.01)

(52) U.S. Cl.
CPC ............ G06F 1/1652 (2013.01); B32B 3/266 (2013.01); Y10T 428/24273 (2015.01); Y10T 428/24298 (2015.01); Y10T 428/24314 (2015.01)

(58) Field of Classification Search
CPC .................. B32B 3/266; Y10T 428/24314
See application file for complete search history.

(56) References Cited

U.S. PATENT DOCUMENTS

2011/0101630 A1  5/2011  Sakai et al.
2016/0357052 A1  12/2016 Kim et al.
2018/0190936 A1* 7/2018  Lee ..................... H01L 51/5237
2019/0165060 A1  5/2019  Choi et al.

FOREIGN PATENT DOCUMENTS

CN    205881905 U    1/2017
CN    108877515 A    11/2018
CN    110021235 A    7/2019
CN    110062077 A    7/2019

OTHER PUBLICATIONS

Office Action of CN Application No. 201911192935.3 and English translation, dated Apr. 27, 2021, 24 pages.

* cited by examiner

Primary Examiner — William P Watkins, III
(74) Attorney, Agent, or Firm — Muncy, Geissler, Olds & Lowe, P.C.

(57) ABSTRACT

The present disclosure relates to a support substrate for a flexible display device, and a flexible display device, the support substrate comprises a bending area, a transition area, and a non-bending area, wherein the transition area is located between the bending area and the non-bending area, the bending area has a plurality of first through holes and the transition area has a plurality of second through holes, wherein an area ratio of the plurality of first through holes in the bending area is greater than an area ratio of the plurality of second through holes in the transition area.

16 Claims, 7 Drawing Sheets

SUPPORT SUBSTRATE FOR FLEXIBLE DISPLAY DEVICE, AND FLEXIBLE DISPLAY DEVICE

CROSS-REFERENCE TO RELATED APPLICATION

The present application claims a priority to Chinese Patent Application No. 201911192935.3 filed in China on Nov. 28, 2019, the disclosure of which is incorporated herein in its entirety by reference.

TECHNICAL FIELD

The present disclosure relates to the field of display technology, and in particular to a support substrate for flexible display device, and a flexible display device.

BACKGROUND

Recently, flexible display devices with advantages of portability and durability have been commercialized. The flexible display device may be implemented in various forms, such as a bendable display device, a foldable display device, and a rollable display device. Such a flexible display device can be applied not only to mobile devices such as smart phones and tablet computers, but also to televisions (TVs), car displays, and wearable devices, and its application fields are expanding. In order to facilitate the bending or unbending operation and provide a beautiful design, the flexible display panel preferably has a thin thickness and a low weight. However, as the flexible display panel becomes thinner and lighter, the physical durability inevitably decreases and it is easily damaged by the outside force provided, which greatly reduces the reliability and stability of the product. Therefore, related devices of the flexible display device still need to be improved.

SUMMARY

One aspect of the present disclosure provides a support substrate for a flexible display device, including a bending area, a transition area, and a non-bending area, wherein the transition area is located between the bending area and the non-bending area, the bending area has a plurality of first through holes and the transition area has a plurality of second through holes, wherein an area ratio of the plurality of first through holes in the bending area is greater than an area ratio of the plurality of second through holes in the transition area.

According to an embodiment of the present disclosure, a hole length of each first through hole is greater than a hole length of each second through hole, and a distance between two adjacent first through holes is smaller than a distance between two adjacent second through holes.

According to an embodiment of the present disclosure, each row of second through holes extend in a first direction, and a plurality rows of second through holes are arranged in a second direction, the first direction is perpendicular to the second direction, and the plurality of second through holes in two adjacent rows are staggered, wherein each row of second through holes and two rows of gap adjacent to the row of second through holes form a unit area, and in a direction away from the bending area, an area ratio of each row of second through holes in the unit area gradually decreases.

According to an embodiment of the present disclosure, a second through hole has a second hole length in the first direction, and a distance between two adjacent second through holes in each row of second through hole is a second hole distance, the second through hole satisfies:

in the direction away from the bending area, the second hole length in the plurality of rows of the second through holes gradually decreases, and the second hole distance gradually increases; or in the direction away from the bending area, the second hole length in the plurality of rows of the second through holes gradually decreases, and the second hole distance is the same; or each row of second through holes includes first sub-holes and second sub-holes alternately arranged in the first direction, a first sub-hole has a first sub-hole length in the first direction, a second sub-hole has a second sub-hole length in the first direction, a distance between the adjacent first sub-hole and the second sub-hole in each row of second through-holes is a sub-hole distance, the first sub-hole length is greater than or equal to the second sub-hole length, and in the direction away from the bending area, the first sub-hole length in the plurality of rows of second through holes gradually decreases, the second sub-hole length gradually increases, and the sub-hole distance is the same.

According to an embodiment of the present disclosure, the transition area includes a first transition area and a second transition area, the first transition area is located between the bending area and the second transition area, in the first transition area, in the direction away from the bending area, the second hole length in the plurality of rows of the second through holes gradually decreases, and the second hole distance is the same;

in the second transition area, in the direction away from the bending area, the second hole length in the plurality of rows of the second through holes gradually decreases, and the second hole distance gradually increases.

According to an embodiment of the present disclosure, each row of second through holes in the transition area includes first sub-holes and second sub-holes alternately arranged in the first direction, and a first sub-hole has a first sub-hole length in the first direction, the transition area includes a third transition area and a fourth transition area, the third transition area is located between the bending area and the fourth transition area, in the third transition area, in the direction away from the bending area, the first sub-hole length in the plurality of rows of the second through holes gradually decreases, the second sub-hole length gradually increases, and the sub-hole distance is the same; and in the fourth transition area, the first sub-hole length is the same as the second sub-hole length, and in the direction away from the bending area, the first sub-hole length in the plurality of rows of the second through holes is the same, the second sub-hole length in the plurality of rows of the second through holes is the same, and the sub-hole distance gradually increases.

According to an embodiment of the present disclosure, a plurality of the second through holes in two rows of the second through holes adjacent to the non-bending area do not overlap.

According to an embodiment of the present disclosure, a contour line of the first through hole includes a plurality of arcs.

According to an embodiment of the present disclosure, two adjacent arcs are smoothly connected.

According to an embodiment of the present disclosure, the first through hole includes a first end portion and a second end portion which are oppositely disposed in the first direction, and a middle portion connected between the first end portion and the second end portion;

wherein contour lines of the first end portion and the second end portion are both configured as an arc, and contour lines of the middle portion are configured as at least one arc.

According to an embodiment of the present disclosure, a convex direction of the contour lines of the first end portion and the second end portion faces the outside of a through hole, and a convex direction of the contour lines of the middle portion faces the inside of the through hole.

According to an embodiment of the present disclosure, the contour lines of the first end portion and the second end portion are both configured as a semi-circular arc, and each segment of the contour lines of the middle portion is configured as an inferior arc.

According to an embodiment of the present disclosure, a maximum width of the first end portion and a maximum width of the second end portion are both larger than a maximum width of the middle portion.

According to an embodiment of the present disclosure, the contour line of the first through hole satisfies at least one of the following conditions: the contour line of the first through hole is symmetrical with respect to a straight line parallel to the first direction;

the contour line of the first through hole is symmetrical with respect to a straight line parallel to the second direction.

According to an embodiment of the present disclosure, each row of first through holes extend in a first direction, and a plurality rows of first through holes are arranged in a second direction, and the plurality of first through holes in two adjacent rows are staggered.

According to an embodiment of the present disclosure, in the second direction, a straight line crossing the bending area intersects at least one contour line of the first through hole.

According to an embodiment of the present disclosure, a through hole satisfies at least one of the following conditions:

$$L: D1=10\sim 200;$$

$$D1: D2=0.5\sim 4;$$

$$W: D2=0.5\sim 5;$$

$$D2: t=0.5\sim 4;$$

$$(D2)^3/L^3<4R;$$

Wherein L is a hole length of the through hole in the first direction, D1 is a distance between two adjacent through holes in the first direction, and D2 is a distance between two adjacent rows of through holes in the second direction, W is a hole width of the through hole in the second direction, t is a thickness of the support substrate, and R is a bending radius of the support substrate.

Another aspect of the present disclosure provides a flexible display device, including:

the support substrate as mentioned above; and a flexible display screen, the flexible display screen is positioned on a side of the support substrate.

DETAILED DESCRIPTION

To describe the objective, the technical solutions and the advantages of embodiments of the present disclosure more clearly, the technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person of ordinary skill in the art based on the described embodiments of the present disclosure fall within the scope of the present disclosure.

The present disclosure is proposed based on the following findings and knowledge of the inventors:

the flexible display device in the related art usually uses a support substrate with a pattern structure on the back of the panel to improve the resilience and flatness of the flexible display device when it is unfolded, but with the requirements of lightness and thinness, the bending resistance and durability of the support substrate cannot meet the requirements for use.

After research, the inventor found that on one hand, because the stiffness of the bending area with the pattern structure is small, and the stiffness of the non-bending area is large, the sudden change in stiffness between the two areas or the uneven distribution of stiffness can easily cause bending. During the process of stress concentration, the support substrate is prone to fracture; on the other hand, the pattern structure is usually formed by opening through holes in the support substrate, and the support substrate at the edge of the through hole and the support substrate between the through holes are also stress concentration areas.

The inventor simulated the stress distribution in the bending process through finite element analysis. From the obtained stress distribution cloud diagram, it can be seen that the stress at the connecting substrate between the bending area and the non-bending area, the edge of the through hole, and between the through holes is large and unevenly distributed, and the support substrate is prone to break at this position.

In view of the above problems, the inventors found that by setting the transition area and changing the contour of the through hole, the problem of stress concentration can be solved to improve the bending resistance, durability and reliability of the support substrate. Based on this, the following technical solutions of the present disclosure are proposed.

In one aspect of the present disclosure, a support substrate for a flexible display device is provided.

Figure 1:
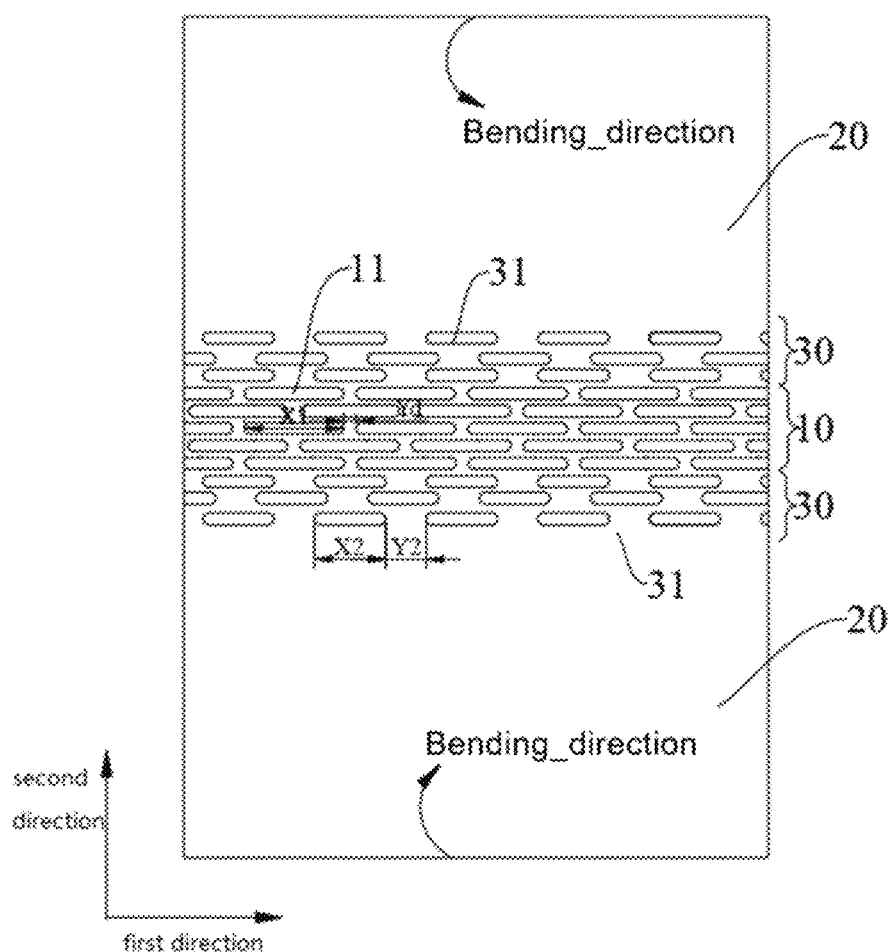
FIG. 1 is a schematic plan view of a support substrate according to an embodiment of the present disclosure.

According to an embodiment of the present disclosure, referring to FIG. 1, support substrate comprises a bending area 10, a transition area 30, and a non-bending area 20, wherein the transition area is located between the bending area 10 and the non-bending area 20, the bending area 10 has a plurality of first through holes and the transition area 30 has a plurality of second through holes, wherein an area ratio of the plurality of first through holes 11 in the bending area 10 is greater than an area ratio of the plurality of second through holes 31 in the transition area 30.

As a result, the proportion of the hollow area in the bending area, the transition area, and the non-bending area decreases in order, and the rigidity of the support substrate increases in order. While the bending is easy to be achieved, in the direction of the bending area towards the non-bending area, the rigidity of the support substrate gradually increases, which can effectively buffer the bending stress and make the bending stress distribution more even. It can effectively solve the problem of stress concentration at the boundary position of the bending area and the non-bending area in the related technology, which greatly reduces the probability of failure. The embossing problem of the support substrate between the bending area and the non-bending area is alleviated.

It should be noted that the description method "an area ratio of the plurality of first through holes" used herein refers to the ratio of the area of the plurality of first through hole to the area of the bending area, that is, in the bending area, the area ratio of the plurality of first through holes=the area of the plurality of first through holes/the area of the bending area×100%; other similar descriptions have the same meaning, such as the area ratio of the plurality of second through holes in the transition area=the area of the plurality of second through holes/the area of the transition region×100%, which will not be repeated one by one here According to an embodiment of the present disclosure, the material of the support substrate may be metal, cemented carbide, etc., and specifically may be stainless steel, copper alloy, titanium alloy, etc., thereby satisfying the use requirements of the support and having better bending performance. It can be understood that, in order to facilitate operations such as bending and unbending, the thickness of the support substrate should not be too thick. In some specific embodiments, the thickness of the support substrate can be 0.05 mm to 0.5 mm, such as 0.05 mm, 0.1 mm, and 0.2. mm, 0.3 mm, 0.4 mm, 0.5 mm, etc. Within this thickness range, the support requirements can be met, and the bending function can be well realized.

According to an embodiment of the present disclosure, reduction of the area ratio of the through-holes may be performed by reducing the distribution density of the through holes and reducing the area of each through-hole (such as reducing the length, width, etc. of the through holes). In some specific embodiments, referring to FIG. 1, a hole length X1 of the first through hole is greater than a hole length X2 of the second through hole, and a distance Y1 between two adjacent first through holes is less than a distance Y2 between two adjacent second through holes.

Figure 2:
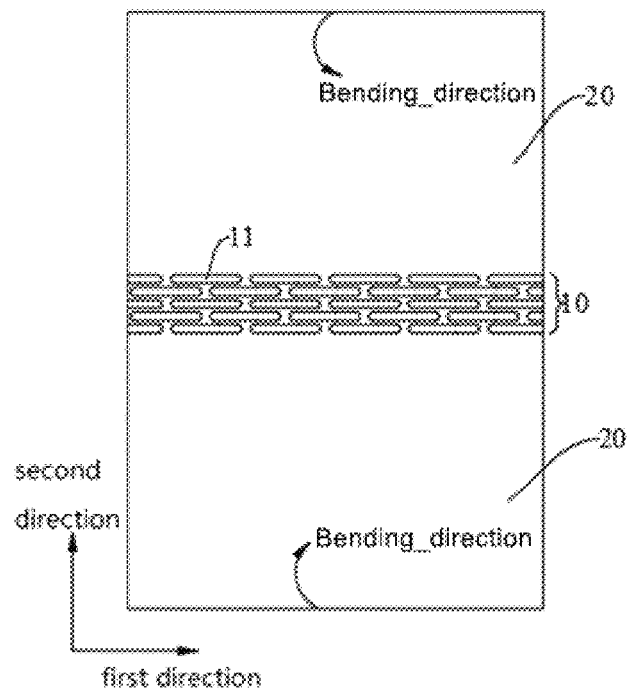
FIG. 2 is a schematic plan view of a support substrate in the related art.

Specifically, the inventor, through a finite element analysis, compared the stress analysis with only a difference between the support substrate with the transition area (Pattern2, see FIG. 1) and the support substrate without the transition area (Pattern1, see FIG. 2). Specifically, in the bending area, the support substrate shown in FIG. 1 and FIG. 2 are respectively bent according to the same bending radius.

From the stress distribution, it can be seen that the magnitude of stress change between the bending area and the non-bending area of the support substrate shown in FIG. 2 is large, and the stress is mainly concentrated at the junction of the bending area and the non-bending area; the magnitude of the stress change between the bending area and the transition area of the support substrate is small, and the stress is distributed more evenly at the junction, which reduces the stress concentration and reduces the risk of damage to the support substrate at that position.

Figure 3:
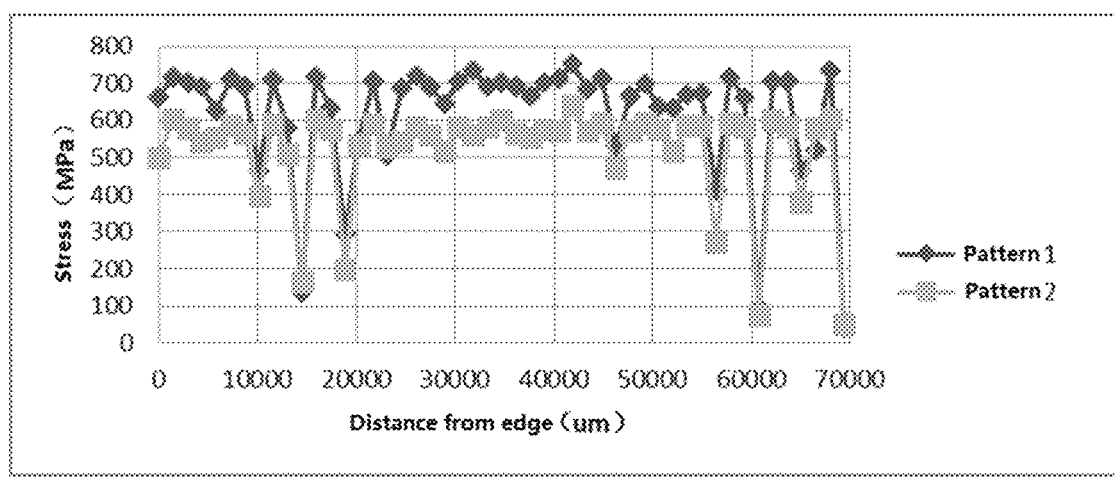
FIG. 3 is a comparison curve of stress distribution at the center of the bending area between a support substrate without a transition area and a support substrate with a transition area.
Figure 4:
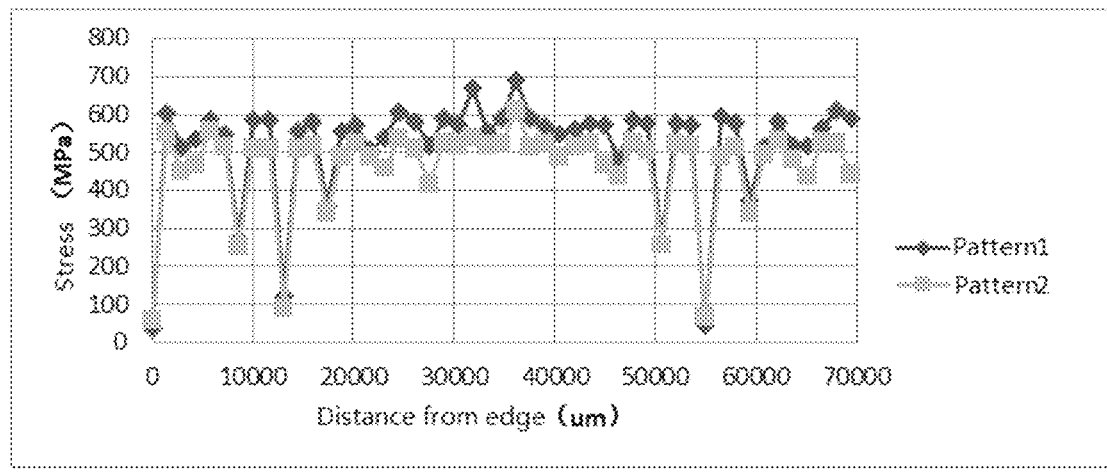
FIG. 4 is a comparison curve of stress distribution at an junctions between a support substrate without a transition area and a support substrate with a transition area.

Further, FIG. 3 shows a comparison curve of stress distribution at the center of the bending area between a support substrate without a transition area and a support substrate with a transition area shown in FIG. 2 and FIG. 1. FIG. 4 shows a comparison diagram of the stress distribution at the junctions between a support substrate without a transition area and a support substrate with a transition area shown in FIG. 2 and FIG. 1.

It can be seen from FIG. 3 and FIG. 4 that the stress at the bending center position of the support substrate with the transition area is reduced by about 95 MPa compared to the stress at the bending center position of the support substrate without the transition area, and the stress at the boundary position is reduced by about 50 MPa. It can be seen that the technical solution according to the embodiments of the present disclosure has a significant effect on reducing the maximum stress of the support substrate, reducing the magnitude of the stress change at the junctions, and making the stress distribution more even, which can effectively improve the bending reliability of the support substrate.

Figure 5:
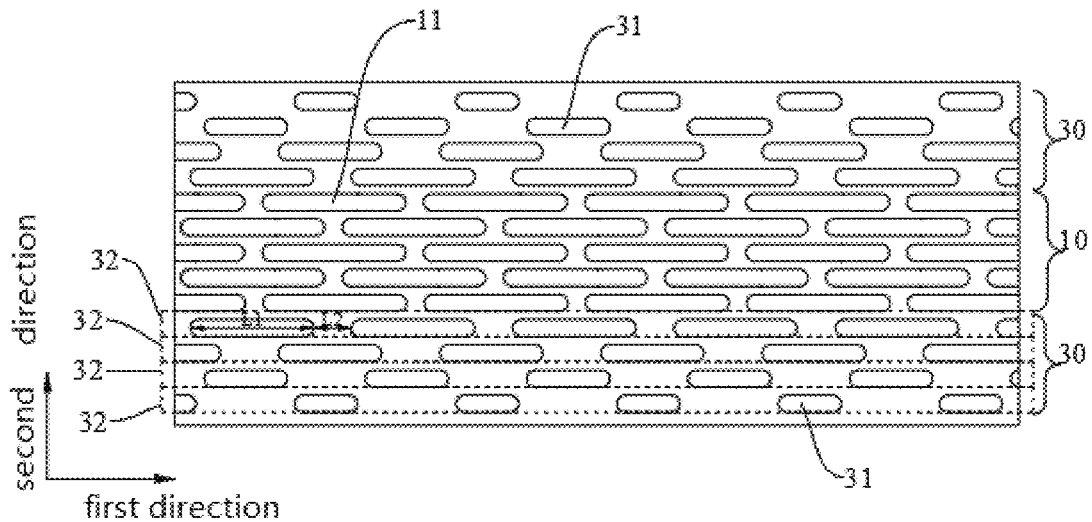
FIG. 5 is a schematic partial structural plan view of a support substrate according to an embodiment of the present disclosure.

According to the embodiments of the present disclosure, in order to further make the transition of the stress at the junctions even, referring to FIG. 5, each row of second through holes 31 extend in a first direction, and a plurality rows of second through holes 31 are arranged in a second direction, the first direction is perpendicular to the second direction, and the plurality of second through holes 31 in two adjacent rows are staggered, and each row of second through holes and two rows of gap adjacent to the each row of second through holes are a unit area 32, in a direction away from the bending area 10, an area ratio of each row of second through holes in the unit area 32 gradually decreases.

Therefore, the rigidity of the support substrate is gradually increased in a direction away from the bending area, and the rigidity of the support substrate can be quickly changed from small to large through a small number of opening layers (that is, fewer second through hole rows). The difference in stiffness and stress on both sides of the transition area can quickly be converged, and the transition is even, which can effectively reduce the failure of the support substrate caused by the stress concentration problem, and reduce the risk of breakage of the support substrate caused by the sudden changes in the bending area and non-bending area, and improve the use reliability of the support substrate.

It can be understood that the higher the proportion of the hollowed area in the support substrate, the lower the rigidity of the support substrate, and the proportion of the hollowed area can be adjusted by adjusting the length and space of the second through holes. Therefore, the length and space of the second through holes change according to a certain trend to adjust the rigidity of the support substrate.

In an embodiment, referring to FIG. 5, a length of a second through hole 31 in the first direction is a second hole length L1, and a distance between two adjacent second through holes 31 in each row of second through hole is a second hole distance L2, in the direction away from the bending area 10, the second hole length L1 in the plurality of rows of the second through holes gradually decreases, and the second hole distance L2 gradually increases.

Specifically, the gradually decreasing magnitude of the second hole length and the gradually increasing magnitude of the second hole distance are not particularly limited, and can be selected according to actual needs. In a specific example, the sum of the second hole length L1 and the second hole distance L2 can be maintained. In the direction away from the bending area, the second hole length L1 of the plurality of rows of second through holes gradually decreases, and the second hole distance L2 gradually increases.

Specifically, in the direction away from the bending area, the plurality of rows of second through holes in the transition area are: the first row of second through holes, the second row of second through holes, the third row of second through holes . . . the nth row of second through holes, where L1+L2 in each row of second through holes are the same, and $L1_m$ in the mth row of through holes is greater than $L1_{m-1}$ in the m-1th row of second through holes, where n is a positive integer, and m is a positive integer greater than 1 and less than or equal to n.

Figure 6:
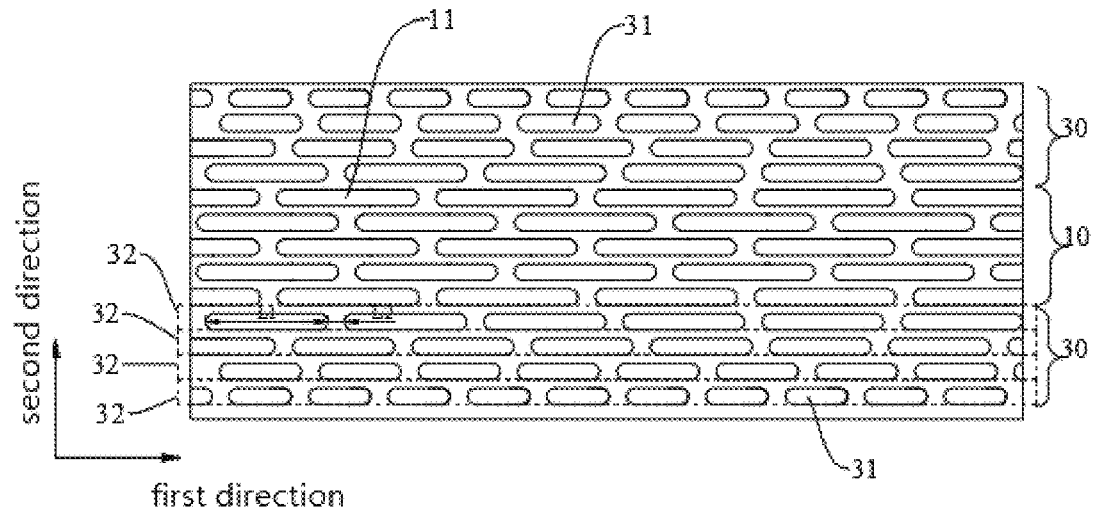
FIG. 6 is a schematic partial structural plan view of a support substrate according to another embodiment of the present disclosure.

In another embodiment, referring to FIG. 6, in the direction away from the bending area 10, the second hole length L1 in the plurality of rows of the second through holes gradually decreases, and the second hole distance L2 gradually is the same.

Specifically, there is no particular limitation on the gradually decreasing magnitude of the second hole length, which can be selected according to actual needs. In some specific examples, the difference between the second hole lengths in any two adjacent rows of second through holes can be equal. That is, the second hole length decreases with equal gradient, that is, $L1_m$-$L1_{m-1}$ is a fixed value. In other specific embodiments, the difference between the second hole lengths in the two adjacent second rows of the through holes can be changed. For example, $L1_m$-$L1_{m-1}$ decreases as m increases, $L1_m$-$L1_{m-1}$ increases as m increases, or $L1_m$-$L1_{m-1}$ changes randomly as m increases.

Figure 7:
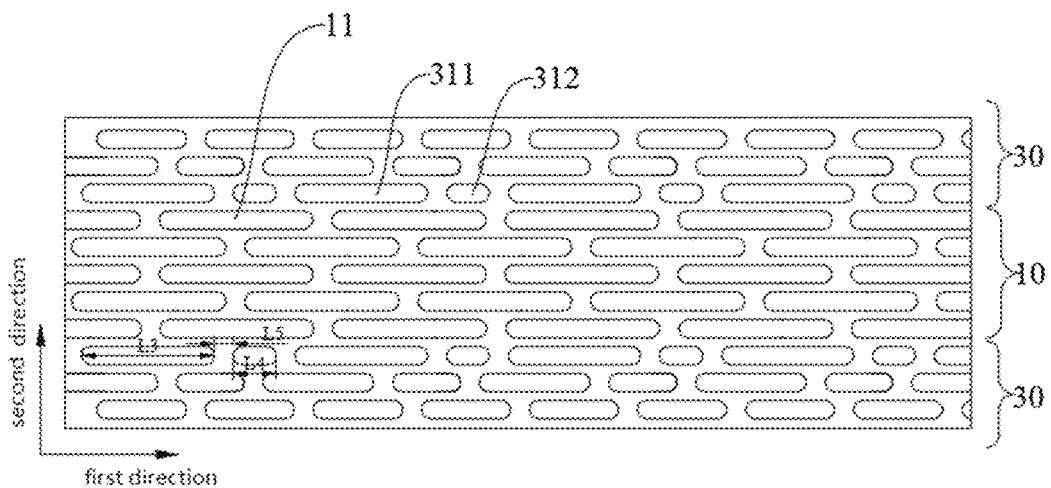
FIG. 7 is a schematic partial structural plan view of a support substrate according to another embodiment of the present disclosure.

In another embodiment, referring to FIG. 7, each row of second through holes comprises first sub-holes 311 and second sub-holes 312 alternately arranged in the first direction, and a length of a first sub-hole 311 in the first direction is a first sub-hole length L3, a length of a second sub-hole 312 in the first direction is a second sub-hole length L4, a distance between the adjacent first sub-hole 311 and the second sub-hole 312 in each row of second through-holes is a sub-hole distance L5, the first sub-hole length L3 is greater than or equal to the second sub-hole length L4, and in the direction away from the bending area, the first sub-hole length L3 in the plurality of rows of second through holes gradually decreases, the second sub-hole length L4 gradually increases, and the sub-hole distance L5 is the same.

Specifically, the gradually decreasing magnitude of the first sub-hole length L3 and the gradually increasing magnitude of the second sub-hole length L4 are also not particularly limited, and may be flexibly selected according to actual needs. In some specific examples, the reduced length of the first sub-hole length and the increased length of the second sub-hole length in each row of the second through holes are equal, that is, $L3_m$-$L3_{m-1}$=$L4_{m-1}$-$L4_m$; in other specific embodiments, the decreased length of the first sub-hole length and the increased second sub-hole length in each row of the second through hole can be randomly changed, such as $L3_m$-$L3_{m-1}$ can increase, decrease or remain unchanged as m increases, $L4_{m-1}$-$L4m$ can also increase, decrease, or remain constant as m increases.

In another implementation, each transition area may combine two or more of the above-mentioned embodiments to achieve an even transition of the rigidness of the support substrate.

Figure 8:
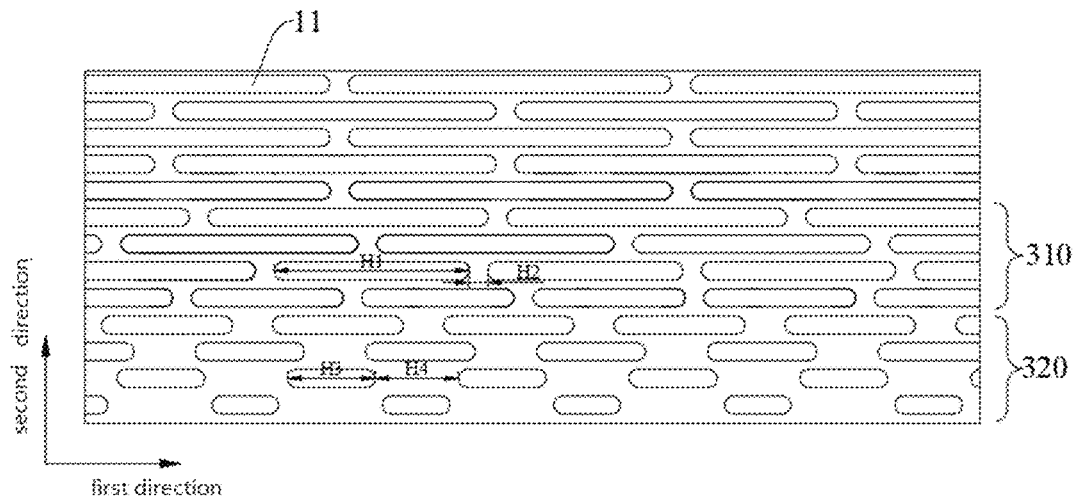
FIG. 8 is a schematic partial structural plan view of a support substrate according to another embodiment of the present disclosure.

In some embodiments, referring to FIG. 8, the transition area comprises a first transition area 310 and a second transition area 320, the first transition area 310 is located between the bending area 10 and the second transition area 320, in the first transition area 310, in the direction away from the bending area 10, the second hole length H1 in the plurality of rows of the second through holes gradually decreases, and the second hole distance H2 is the same; and in the second transition area 320, in the direction away from the bending area 10, the second hole length H3 in the plurality of rows of the second through holes gradually decreases, and the second hole distance H4 gradually increases.

Figure 9:
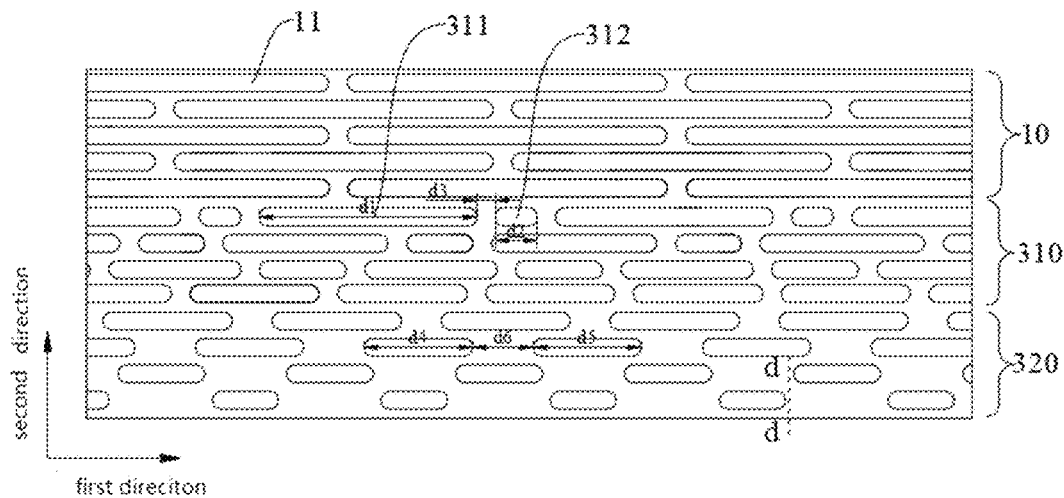
FIG. 9 is a schematic partial structural plan view of a support substrate according to another embodiment of the present disclosure.

In other specific embodiments, referring to FIG. 9, each row of second through holes in the transition area comprises first sub-holes 313 and second sub-holes 314 alternately arranged in the first direction, the transition area comprises a third transition area 330 and a fourth transition area 340, the third transition area 330 is located between the bending area 10 and the fourth transition area 340, in the third transition area 330, in the direction away from the bending area 10, the first sub-hole length d1 in the plurality of rows of the second through holes gradually decreases, the second sub-hole length d2 gradually increases, and the sub-hole distance d3 is the same; in the fourth transition area 340, the first sub-hole length d4 is the same as the second sub-hole length d5, in the direction away from the bending area 10, the first sub-hole length d4 in the plurality of rows of the second through holes is the same, the second sub-hole length d5 is the same, and the sub-hole distance d6 gradually increases.

The rigidity of the support substrate can be made even, the processing time can be reduced, and the production efficiency can be improved.

According to an embodiment of the present disclosure, referring to FIG. 9, among the above-mentioned ways of adjusting the hole length and distance of the second through holes, in a direction away from the bending area 10, the hole length and distance of the second through holes may be gradually changed, until a plurality of the second through holes in two rows of the second through holes adjacent to the non-bending area 20 do not overlap. Specifically, in the second direction, there is a straight line d-d that spans two rows of the second through holes adjacent to the non-bending area 20 and does not intersect the contour line of the second through holes.

Figure 10:
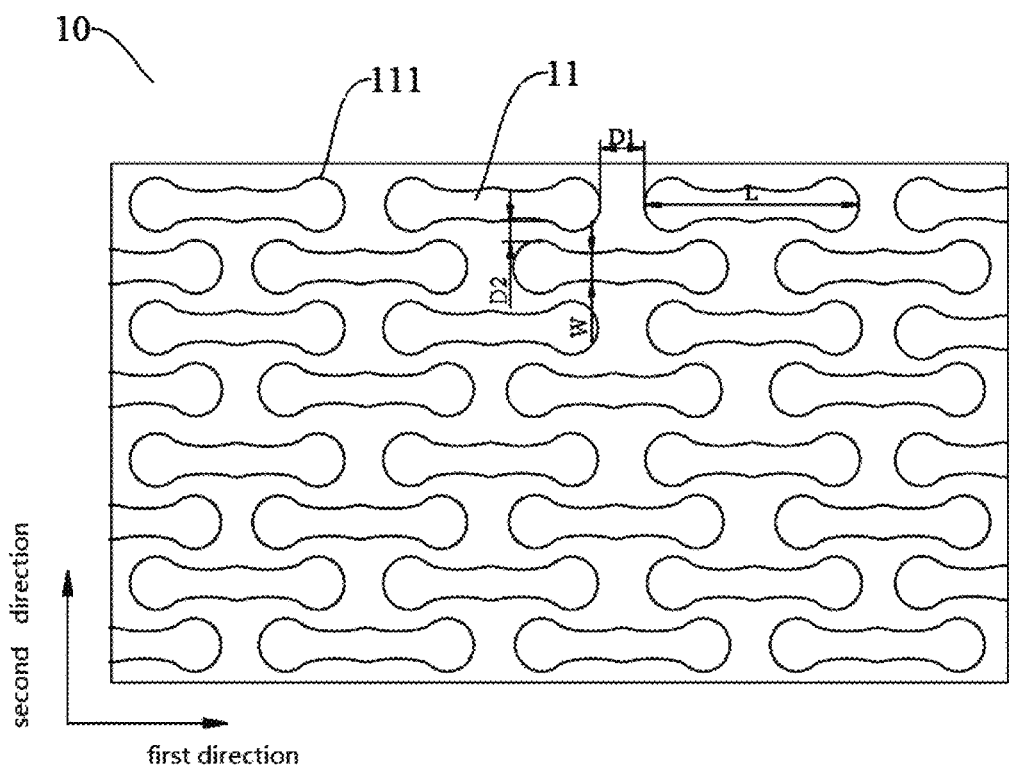
FIG. 10 is a schematic partial structural plan view of a support substrate according to another embodiment of the present disclosure.

According to an embodiment of the present disclosure, referring to FIG. 10, a contour line 111 of the first through hole 11 is composed of a plurality of arcs. The contour line of the first through hole in the support substrate is configured as an arc, which can better disperse the stress of the flexible display device during bending and avoid stress concentration. The maximum stress on the support substrate is significantly reduced during bending, and the flexible display device significantly improved bending resistance and physical durability.

Specifically, the support substrate is provided with through holes, which can more easily realize the bending of the flexible display device. However, due to the existence of the through hole, the edge position of the through hole, the position between adjacent through holes, etc. may generate stress concentration, which is not conducive to the bending resistance and physical durability of the support substrate. In the present disclosure, the contour line of the first through hole is set to be arc-shaped. On one hand, the length of the arc is longer, so that the bending stress can be distributed along a longer contour line. On the other hand, the arc is a smoothly changing curve, which avoids sudden changes in the contour line (such as right-angle turns, etc.), and thus avoiding most of the stress concentrated in the sudden changes in the contour lines; therefore, the bending stress in the support substrate can be more evenly dispersed, the maximum stress on the support substrate is significantly reduced during bending, and the bending resistance and physical durability are better.

It should be noted that when bending, different positions of the support substrate will bear different bending stresses, some positions will bear large bending stresses, and some positions will experience small bending stresses. The above-mentioned maximum stress on the support substrate during bending refers to the corresponding bending stress at the position where the maximum bending stress is received during bending.

Figure 11:
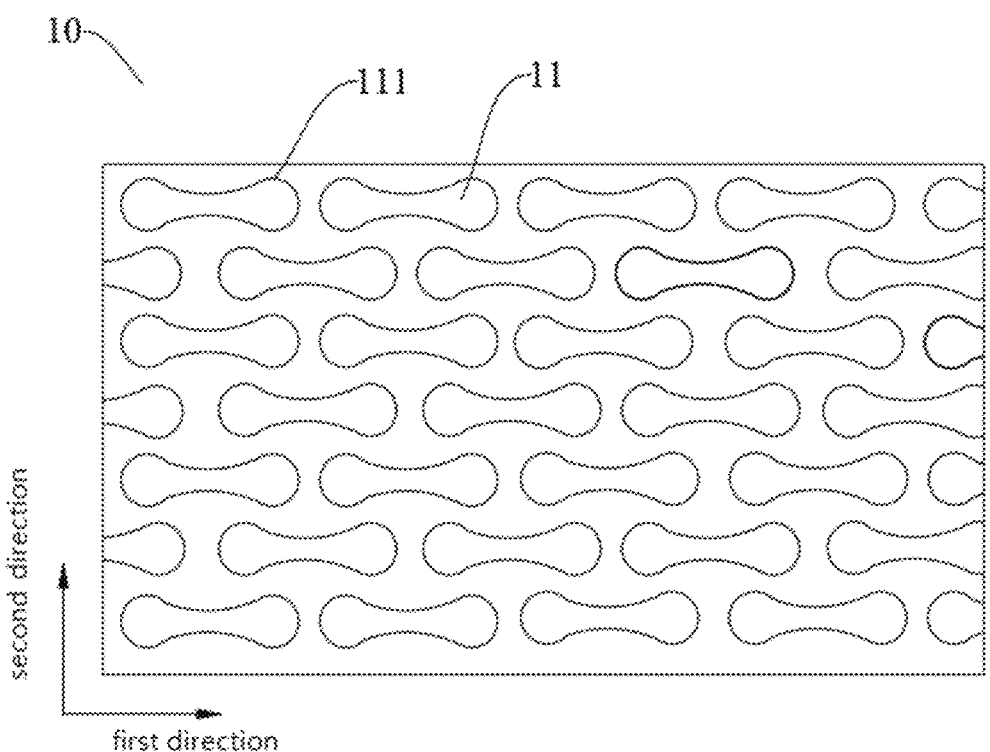
FIG. 11 is a schematic partial structural plan view of a support substrate according to another embodiment of the present disclosure.

According to the embodiment of the present disclosure, the contour line of the first through hole may be composed of a plurality of arcs, that is, the plurality of arcs are sequentially connected to form the contour of the through holes. In some specific embodiments, referring to FIG. 10 to FIG. 12, the contour line 111 of the first through hole is composed of a plurality of arcs, and two adjacent arcs are smoothly connected to each other. Thus, the effect of reducing the maximum stress on the support substrate during bending is better.

According to the embodiments of the present disclosure, in order to better disperse the bending stress, the specific shape, size, distribution manner, and the like of the first through hole may be further designed, and described in further detail below with reference to the drawings.

Figure 13:
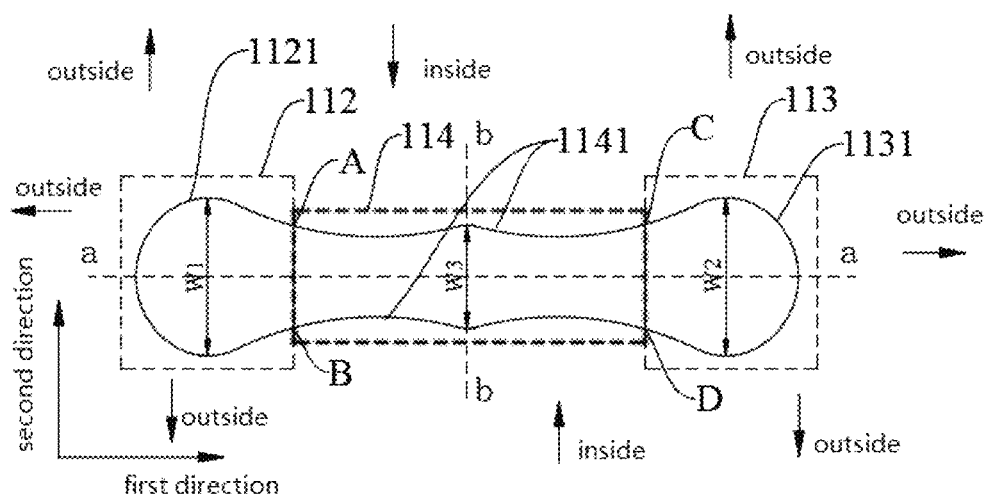
FIG. 13 is a schematic partial structural plan view of a support substrate according to another embodiment of the present disclosure.

According to the embodiments of the present disclosure, referring to FIG. 13, the first through hole 11 comprises a first end portion 112 and a second end portion 113 which are oppositely disposed in the first direction, and a middle portion114 connected between the first end portion 112 and the second end portion 113; wherein contour lines 1121 of the first end portion and contour lines 1131 the second end portion are both configured as an arc, and contour lines 1141 of the middle portion connected between one end point of the contour lines of the first end portion and one end point of the contour lines of the second end portion are configured as at least one arc.

Specifically, the contour line 1121 of the first end portion has two end points A and B, the contour line 1131 of the second end portion has two end points C and D, and the contour line of the middle portion includes two parts connected between the end points A and C, and between the end points B and D, wherein the contour line of the middle portion connected between the endpoints A and C can be configured as at least one arc, the contour line of the middle portion connected between the endpoints B and D can also be configured as at least one arc.

Figure 12:
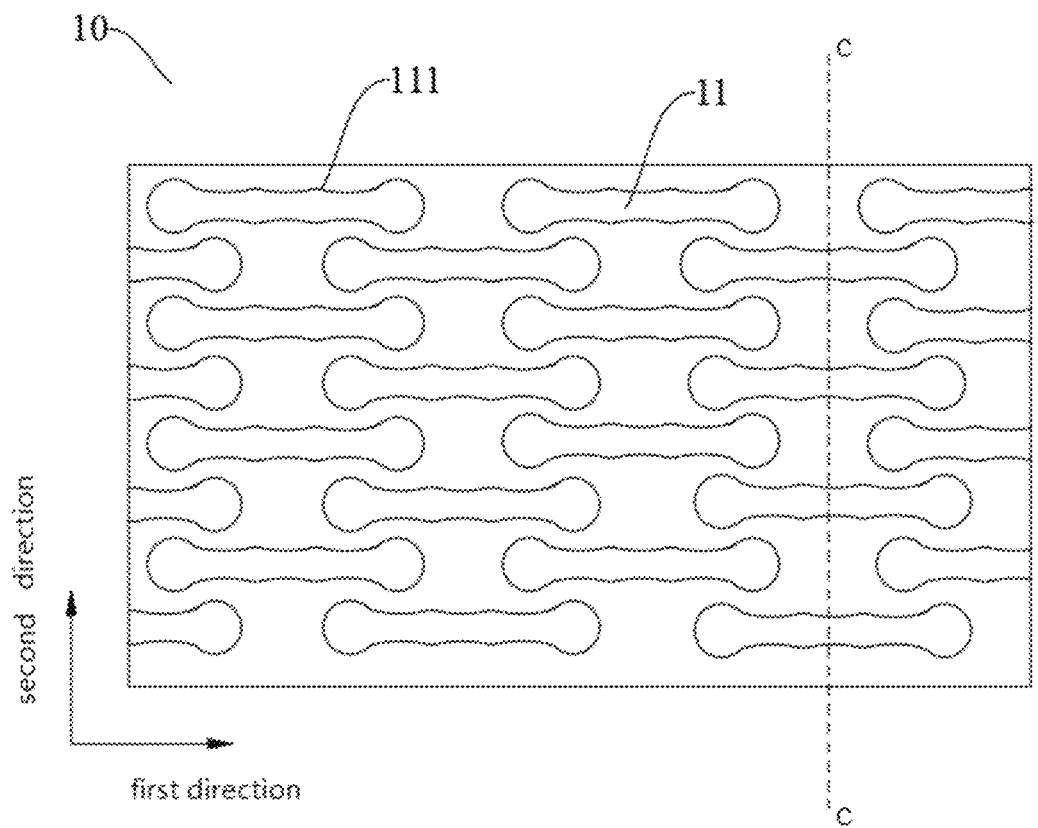
FIG. 12 is a schematic partial structural plan view of a support substrate according to another embodiment of the present disclosure.

Further, the contour line of the middle portion connected between the endpoints A and C and the contour line of the middle portion connected between the endpoints B and D can be independently constructed as an arc (referring to FIG. 11) or multiple arcs connected in sequence (referring to FIG. 10 and FIG. 12).

According to the embodiments of the present disclosure, referring to FIG. 13, the contour lines 1121 of the first end portion and the contour lines 1131 of the second end portion are both configured as a semi-circular arc, and each segment of the contour lines 1141 of the middle portion is configured as an inferior arc (arc that is less than a semicircle).

According to the embodiments of the present disclosure, referring to FIG. 13, a convex direction of the contour lines 1121 of the first end portion and the contour lines 1131 of the second end portion faces the outside of a first through hole 11, and a convex direction of the contour lines 1141 of the middle portion faces the inside of the first through hole 11. In this way, the arcs of the contour lines at the end portion and the middle portion are opposite to each other, and the two adjacent arcs are more easily connected by a smooth transition. In addition, the effect of dispersing stress is better in such an arrangement, and the maximum bending stress on the support substrate is significantly reduced during bending.

In order to distribute the bending stress more evenly, in some specific embodiments, referring to FIG. 13, a maximum width W1 of the first end portion 112 and a maximum width W2 of the second end portion 113 are both larger than a maximum width W3 of the middle portion 114. In some embodiments, referring to FIG. 13, the contour line 111 of the first through hole is symmetrical with respect to a straight line a-a parallel to the first direction; In some embodiments, referring to FIG. 13, the contour line 111 of the first through hole is symmetrical with respect to a straight line b-b parallel to the second direction.

According to an embodiment of the present disclosure, a plurality of the first through holes may be provided in a specific arrangement manner. In some specific embodiments, referring to FIGS. 10 to 12, each row of first through holes 11 extend in a first direction, and a plurality rows of first through holes 11 are arranged in a second direction, and the plurality of first through holes in two adjacent rows are staggered, the second direction is perpendicular to the first direction.

It should be noted that the staggered arrangement of a plurality of first through holes in any adjacent two rows of first through holes means that two adjacent first through holes located in two adjacent rows are not aligned in the second direction. Specifically, a plurality of first through holes in two rows of first through holes arranged at intervals may be aligned in the second direction, and a first through-hole spaced between two rows of first through-holes in which the first through-holes are aligned. The number of first through hole rows spaced between two rows of first through holes that are aligned can be flexibly selected according to actual needs, such as one row (referring to FIGS. 10 to 12), two rows, three rows, four rows, and so on. The meaning of the staggered arrangement of the plurality of second through holes in any two adjacent rows of the second through holes has the same meaning, and is not repeated here.

According to an embodiment of the present disclosure, in order to better avoid stress concentration, referring to FIG. 12, in the second direction, a straight line c-c crossing the bending area 10 intersects at least one contour line 111 of the first through hole 11. As a result, the support substrate cannot form a continuous channel in the second direction. When the support substrate is bent, the first through hole can play a good role in dispersing stress, avoiding stress concentration caused by the continuous channel, thereby reducing the bending resistance and physical durability of the support substrate.

According to an embodiment of the present disclosure, in the second direction, a distance D2 between two adjacent rows of first through holes at any different positions is substantially the same. Thereby, the stress dispersion is more even, and the maximum stress is effectively reduced when the support substrate is bent. It can be understood that the higher the consistency of the distance D2 between the adjacent two rows of the first through holes at any different positions, the better the effect of dispersing stress, but because the contour line of the first through holes is an arc, not a straight line, therefore, due to different curvatures of the arc, manufacturing process errors, and the like, the distance D2 between the first through holes of two adjacent rows may be slightly different at different positions. Therefore, in the present disclosure, by setting the curvature of the arc and so on, the distance D2 between two adjacent first rows of first through holes at different positions is kept as consistent as possible, but allows a certain error range.

According to an embodiment of the present disclosure, a through hole satisfies at least one of the following conditions: L: D1=10~200 (specifically, such as 10, 50, 80, 100, 120, 150, 190, 200, etc.); D1: D2=0.5-4 (specifically 0.5, 1, 2, 3, 4, etc.); W: D2=0.5-5 (specifically 0.5, 1, 2, 3, 4, 5, etc.); D2: t=0.5-4 (specifically 0.5, 1, 2, 3, 4, etc.); (D2)$^3$/L$^3$<4R; Wherein L is a hole length of the through hole in the first direction, D1 is a distance between two adjacent through holes in the first direction, and D2 is a distance between two adjacent rows of through holes in the second direction, W is a hole width of the through hole in the second direction, t is a thickness of the support substrate, and R is a bending radius of the support substrate.

Specifically, the first through hole may satisfy any one of the above conditions, any two conditions, any three conditions, any four conditions, or all five conditions. Through simulation calculations, when the above conditions are met, the stress distribution is more even, and the maximum stress during bending is lower.

According to the embodiment of the present disclosure, the support substrate is bent in a bending area when it is actually used. Specifically, the bending area may be an elongated area, and the length direction of the bending area may be parallel to the first direction, that is, during the bending process, the non-bending areas on both sides of the bending area move toward each other. For specific bending directions, refer to arrows in FIG. 1. Therefore, the arrangement of the first through hole and the bending direction are better, the effect of dispersing stress is better, and the maximum stress of the support substrate is effectively reduced during bending. It can be understood that the contour line of the second through hole may also be composed of a plurality of segments of arcs, and specifically, may be the same as the contour line of a plurality of segments of arcs of the first through hole, and details are not repeated here.

Figure 14:
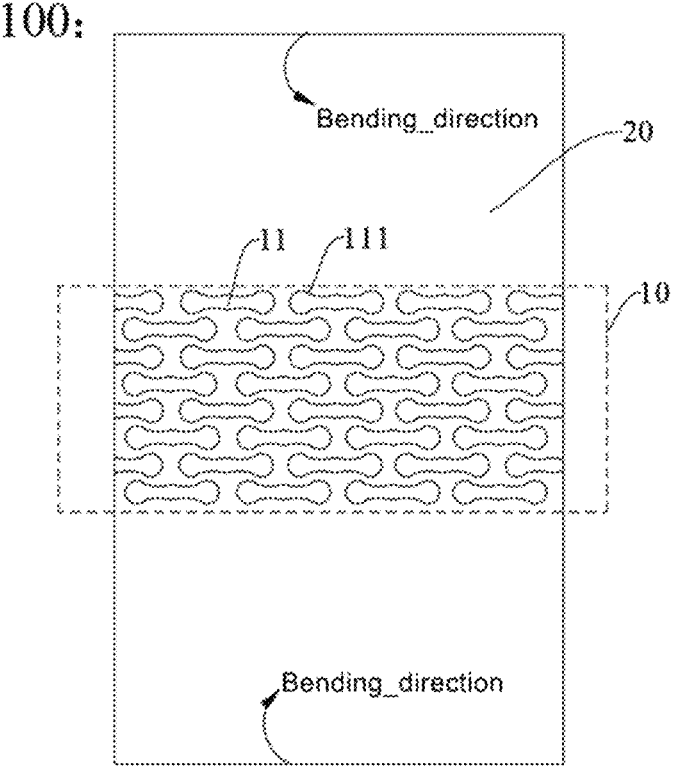
FIG. 14 is a schematic plan view of a support substrate according to an embodiment of the present disclosure.

In another aspect of the present disclosure, the present disclosure provides a support substrate for a flexible display device. According to an embodiment of the present disclosure, referring to FIG. 14, the support substrate 100 has a bending area 10 and a non-bending area 20. At least the bending area 10 is provided with a plurality of first through holes 11 spaced apart from each other. The contour line 111 of the first through hole 11 is composed of a plurality of arcs. The contour line of the first through hole in the support substrate is configured as an arc, which can better disperse the stress of the flexible display device during bending and avoid stress concentration. The maximum stress on the support substrate is significantly reduced during bending, and the flexible display device significantly improved bending resistance and physical durability.

Specifically, the first through holes in the support substrate may be consistent with the first through holes described above, and have all the features and advantages of the first through holes described above, which are not repeated here one by one.

Specifically, the inventor used a finite element analysis to simulate and test the maximum stress of a support substrate provided with first through holes of different shapes (only the first through hole is provided in the bending area, and no other through hole is provided in the other area) when the deformation amount is 5%. The parameters are the same except that the shape of the first through hole is different. The test results show that when the shape of the first through hole is a semi-circular end rectangle (refer to FIG. 5), the maximum stress of the supporting substrate is 1350 MPa; when the through hole shape is a semi-circular end arc, the maximum stress of the support substrate is 1125 MPa; when the through hole shape is a semi-circular end arc, the maximum stress of the support substrate is 934 MPa. It can be clearly seen from the simulation data that the contour of the first through hole is composed of multiple arc segments, which can significantly reduce the maximum stress of the supporting substrate during bending.

It should also be noted that the widths of the first and second through holes in the second direction described herein are not particularly limited. In order to facilitate processing, the widths of the first and second through holes in the second direction can be equal.

In another aspect of the present disclosure, the present disclosure provides a flexible display device. According to an embodiment of the present disclosure, the flexible display device comprises: the support substrate described above; and a flexible display screen, which is positioned on one side of the support substrate. The metal support substrate in the flexible display device has good support and provides a strong rebound force for the flexible display to remain flat. While being thin and light, it also has better flatness, better impact resistance, smaller metal support stamps and better bending reliability, bending resistance and physical durability.

According to the embodiment of the present disclosure, the specific type of the flexible display device is not particularly limited, and may include, for example, a mobile phone, a tablet computer, a television, a game machine, a wearable device, and the like. It can be understood that, in addition to the foregoing support substrate and flexible display screen, the flexible display device may also include structures and components necessary for a conventional flexible restriction device, such as a shell, a battery, a touch screen, etc. It is not repeated here one by one.

In the description of the present disclosure, it is to be understood that the terms "first" and "second" are used only for descriptive purposes and cannot be understood to indicate or imply relative importance or implicitly indicate the number of indicated technical features. Thus, features defined as "first" and "second" may include one or more of these features either explicitly or implicitly. In the description of the present disclosure, "multiple" means two or more unless otherwise clearly and specifically defined.

In the description of this specification, the description of the reference term "one embodiment", "some embodiments", "examples", "specific examples", or "some examples" means that the specific features, structures, materials or features described in combination with the embodiment or example are included in at least one embodiment or example of the present disclosure. In this specification, the schematic representation of the above terms does not have to be directed to the same embodiment or example. Furthermore, the specific features structures materials or features described may be combined in an appropriate manner in any one or more embodiments or examples. In addition, without contradiction, those skilled in the art may combine different embodiments or examples as well as combine the characteristics of the different embodiments or examples described in this specification.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A support substrate for a flexible display device, comprising
    a bending area;
    a transition area; and
    a non-bending area,
    wherein the transition area is located between the bending area and the non-bending area, the bending area has a plurality of first through holes, the transition area has a plurality of second through holes,
    wherein an area ratio of the plurality of first through holes in the bending area is greater than an area ratio of the plurality of second through holes in the transition area,
    wherein a contour line of the first through hole comprises a plurality of arcs, the first through hole comprises a first end portion and a second end portion which are oppositely disposed in the first direction, and a middle portion connected between the first end portion and the second end portion, and
    wherein contour lines of the first end portion and the second end portion are both configured as an arc, and contour lines of the middle portion are configured as at least one arc.

2. The support substrate according to claim 1, wherein a hole length of each first through hole is greater than a hole length of each second through hole, and a distance between two adjacent first through holes is smaller than a distance between two adjacent second through holes.

3. The support substrate according to claim 1, wherein each row of second through holes extend in a first direction, and a plurality rows of second through holes are arranged in a second direction, the first direction is perpendicular to the second direction, and the plurality of second through holes in two adjacent rows are staggered, wherein each row of second through holes and two rows of gap adjacent to the row of second through holes form a unit area, and in a direction away from the bending area, an area ratio of each row of second through holes in the unit area gradually decreases.

4. The support substrate according to claim 3, wherein a second through hole has a second hole length in the first direction, and a distance between two adjacent second through holes in each row of second through hole is a second hole distance, the second through hole satisfies:
    in the direction away from the bending area, the second hole length in the plurality of rows of the second through holes gradually decreases, and the second hole distance gradually increases; or
    in the direction away from the bending area, the second hole length in the plurality of rows of the second through holes gradually decreases, and the second hole distance is the same; or
    each row of second through holes comprises first sub-holes and second sub-holes alternately arranged in the first direction, a first sub-hole has a first sub-hole length in the first direction, a second sub-hole has a second sub-hole length in the first direction, a distance between the adjacent first sub-hole and the second sub-hole in each row of second through-holes is a sub-hole distance, the first sub-hole length is greater than or equal to the second sub-hole length, and in the direction away from the bending area, the first sub-hole length in the plurality of rows of second through holes gradually decreases, the second sub-hole length gradually increases, and the sub-hole distance is the same.

5. The support substrate according to claim 4, wherein the transition area comprises a first transition area and a second transition area, the first transition area is located between the bending area and the second transition area,
    in the first transition area, in the direction away from the bending area, the second hole length in the plurality of rows of the second through holes gradually decreases, and the second hole distance is the same; and
    in the second transition area, in the direction away from the bending area, the second hole length in the plurality of rows of the second through holes gradually decreases, and the second hole distance gradually increases.

6. The support substrate according to claim 4, wherein each row of second through holes in the transition area comprises first sub-holes and second sub-holes alternately arranged in the first direction, and a first sub-hole has a first sub-hole length in the first direction, the transition area comprises a third transition area and a fourth transition area, the third transition area is located between the bending area and the fourth transition area,
    in the third transition area, in the direction away from the bending area, the first sub-hole length in the plurality of rows of the second through holes gradually decreases, the second sub-hole length gradually increases, and the sub-hole distance is the same; and
    in the fourth transition area, the first sub-hole length is the same as the second sub-hole length, and in the direction away from the bending area, the first sub-hole length in the plurality of rows of the second through holes is the same, the second sub-hole length in the plurality of rows of the second through holes is the same, and the sub-hole distance gradually increases.

7. The support substrate according to claim 4, wherein a plurality of the second through holes in two rows of the second through holes adjacent to the non-bending area do not overlap.

8. The support substrate according to claim 1, wherein two adjacent arcs are smoothly connected.

9. The support substrate according to claim 1, wherein a convex direction of the contour lines of the first end portion and the second end portion faces the outside of a through hole, and a convex direction of the contour lines of the middle portion faces the inside of the through hole.

10. The support substrate according to claim 1, wherein the contour lines of the first end portion and the second end portion are both configured as a semi-circular arc, and each segment of the contour lines of the middle portion is configured as an inferior arc.

11. The support substrate according to claim 1, wherein a maximum width of the first end portion and a maximum width of the second end portion are both larger than a maximum width of the middle portion.

12. The support substrate according to claim 1, wherein the contour line of the first through hole satisfies at least one of the following conditions:
the contour line of the first through hole is symmetrical with respect to a straight line parallel to the first direction;
the contour line of the first through hole is symmetrical with respect to a straight line parallel to the second direction.

13. The support substrate according to claim 1, wherein each row of first through holes extend in a first direction, and a plurality rows of first through holes are arranged in a second direction, and the plurality of first through holes in two adjacent rows are staggered.

14. The support substrate according to claim 13, wherein in the second direction, a straight line crossing the bending area intersects at least one contour line of the first through hole.

15. The support substrate according to claim 13, wherein a through hole satisfies at least one of the following conditions:

$L: D1=10\sim200;$ $D1: D2=0.5\sim4;$ $W: D2=0.5\sim5;$ $D2: t=0.5\sim4;$ $(D2)^3/L^3<4R;$ wherein L is a hole length of the through hole in the first direction, D1 is a distance between two adjacent through holes in the first direction, and D2 is a distance between two adjacent rows of through holes in the second direction, W is a hole width of the through hole in the second direction, t is a thickness of the support substrate, and R is a bending radius of the support substrate.

16. A flexible display device, comprising:
the support substrate according to claim 1; and
a flexible display screen positioned on a side of the support substrate.

* * * * *